Sept. 9, 1958      E. A. HILTON      2,851,596
ELECTRONIC COUNTER
Filed April 15, 1954      2 Sheets-Sheet 1
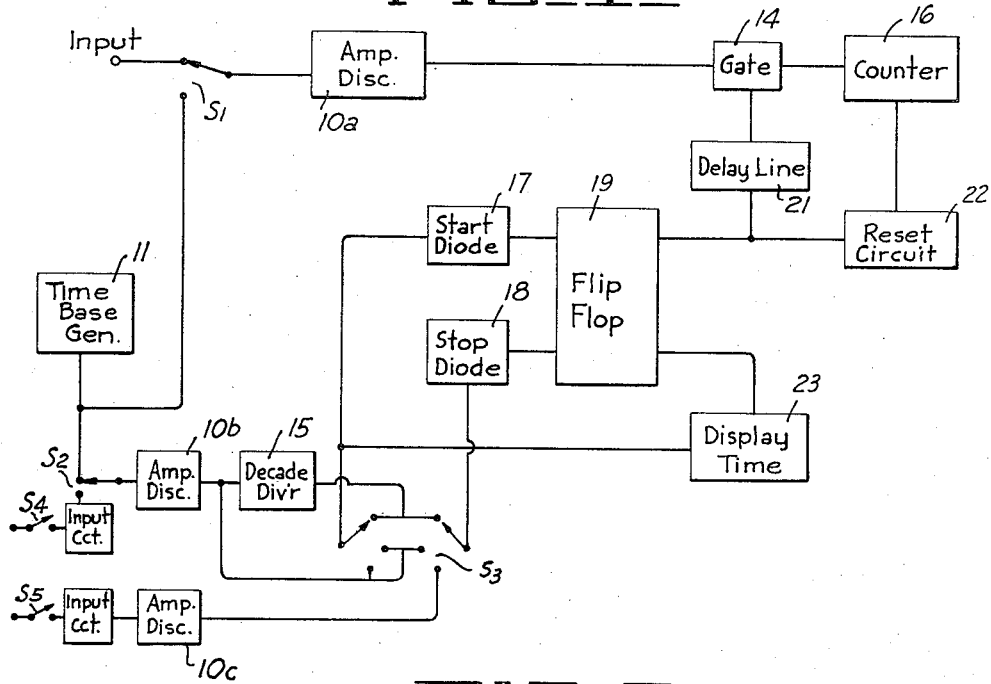
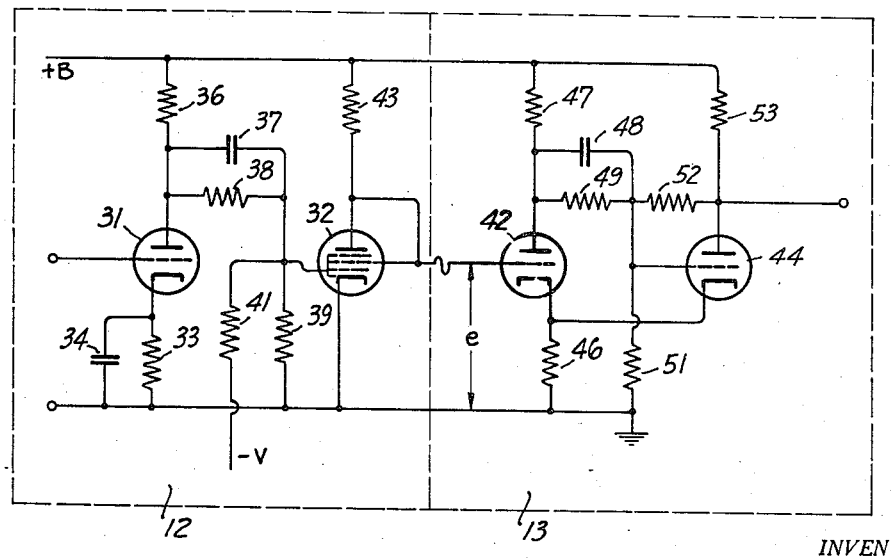
INVENTOR.
Edgar A. Hilton
BY
ATTORNEYS Sept. 9, 1958     E. A. HILTON     2,851,596
ELECTRONIC COUNTER
Filed April 15, 1954     2 Sheets-Sheet 2
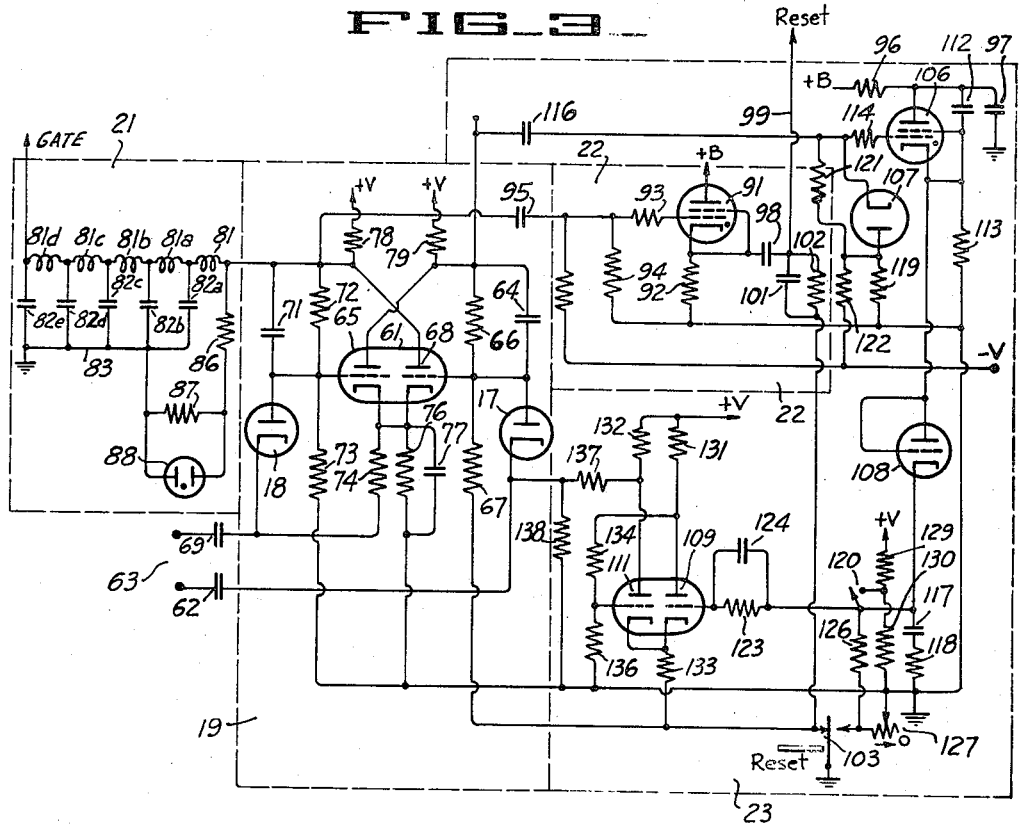
FIG_3_
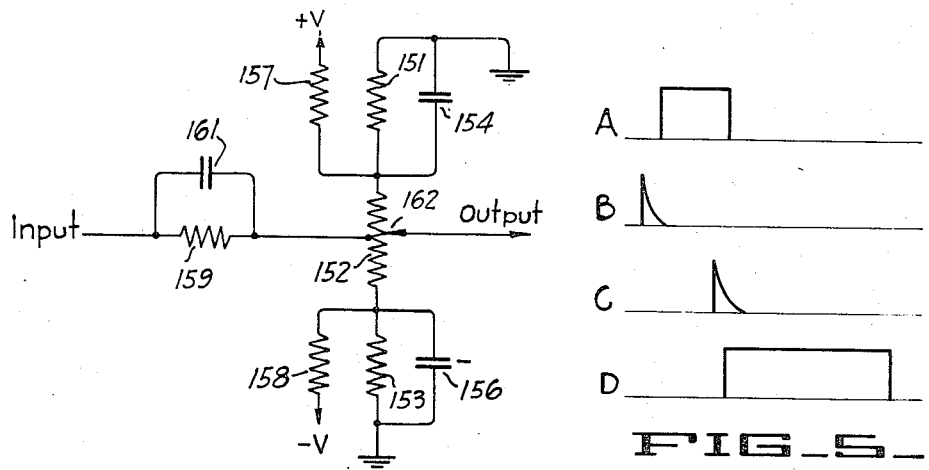
FIG_4_
FIG_5_
INVENTOR.
Edgar A. Hilton
BY
ATTORNEYS

United States Patent Office 2,851,596
Patented Sept. 9, 1958

2,851,596

ELECTRONIC COUNTER

Edgar A. Hilton, Palo Alto, Calif., assignor to Hewlett-Packard Company, Palo Alto, Calif., a corporation of California Application April 15, 1954, Serial No. 423,409

17 Claims. (Cl. 250—27)

This invention relates generally to electronic apparatus for counting and more particularly to electronic apparatus which is capable of measuring frequency, period, time interval and total events.

It is an object of this invention to provide apparatus capable of counting frequencies which are periodic such as electrical frequencies, or random as with nuclear particles.

It is a further object of this invention to provide electronic apparatus which is capable of measuring the time which elapses between the occurrence of two events.

It is still another object of this invention to provide electronic apparatus capable of indicating total events.

It is a further object of this invention to provide electronic apparatus in which the count is displayed for a predetermined interval of time.

It is still a further object of this invention to provide electronic apparatus capable of discriminating between signals having different amplitudes.

Additional objects and features of the invention will appear from the following description in which the preferred embodiment has been set forth in detail in conjunction with the accompanying drawings:

Figure 1 is a schematic drawing illustrating an embodiment of the invention.

Figure 2 is a circuit diagram illustrating the amplitude discriminators incorporated in Figure 1.

Figure 3 is a circuit diagram illustrating the starting and stopping diodes, the flip-flop, the delay line, the reset and display time circuits.

Figure 4 shows the input circuit employed in the measurement of time intervals.

Figure 5 illustrates a waveform diagram of the sequence of voltages at elements in Figure 1.

In general in accordance with the present invention, for frequency measurement, the unknown waves or impulses are shaped and applied to an electronic gate. The gate is opened for accurate timed intervals. With the gate open the shaped pulses are applied to counter circuits. For period or time interval measurements, the counters count the output of a standard interval frequency generator during one or more cycles of the unknown frequency, or between two impulses the intervals between which is to be measured. The counted values may be displayed for a pre-selected period of time. The counts may also be displayed for an indefinite period of time.

Referring to the schematic diagram of Figure 1 the input frequency is applied to the circuit 10a. In actual practice this may be any suitable circuit for amplifying and clipping the input wave form to provide a squared output, one pulse occurring for each input pulse. However, I prefer to use a special amplifier and amplitude discriminating circuit. One type of amplitude discriminating circuit which I have employed is shown in Figure 2. Briefly, this circuit consists of a direct coupled amplifier section 12 and a special trigger circuit 13. The amplifier is a vacuum tube amplifier which has an output signal, for given input signal, which is substantially independent of plate or filament supply voltage variation and which is capable of relatively stable operation at very low frequencies. The state of the trigger circuit depends on the instantaneous value of the input voltage. The hysteresis of the trigger circuit 13 is greater than zero and there is a range of input voltages where either of two states may exist, depending on the immediately preceding history of the input signal. This circuit incorporates means for controlling the hysteresis range. The circuits of Figure 2 will be presently described in detail.

The output of amplitude discriminator 10a is applied to the gate circuit through a capacitor which provides a differentiated output to the gate 14; when the gate is open the pulses are applied to the counting circuit 16.

For the gate 14 I have employed one of the triode vacuum tube type such as disclosed in "Waveforms" by Chance Hughes, MacNichol, Sayre and Williams, volume XIX, McGraw-Hill, Inc. Such a gate is capable of accurate high speed operation, and is opened and closed in accordance with application of controlling pulses, presently described.

The time base generator 11 provides a plurality of accurately controlled frequencies. It can consist of a suitable crystal controlled oscillator together with a series of frequency dividers. In practice I have used a time base generator which supplies 100 kc., 10 kc. and 1 kc., and 100, 10 and 1 C. P. S. signals. The signal from the time base generator 11 is fed into amplitude discriminator 10b which is identical with 10a. The output of the amplitude discriminator 10b is of the squared type and is applied to the scaler 15.

The output of the decade scaler 15 provides timed impulses for operating the diodes 17 and 18. A conventional decade scaler of the electronic type may be employed. The output of the decade scaler provides one pulse for each 10 input pulses. The output pulses of the decade scaler occur at time intervals of 0.001, 0.01, 0.1, 1 or 10 seconds as desired, corresponding to the frequencies indicated for the time base generator.

The output of the decade scaler 15 is applied to both the start diode 17 and the stop diode 18 of the flip-flop 19. As will be presently explained, the diodes couple the negative pulse to the conducting tube and block the pulse from the non-conducting tube.

The square pulses appearing on one plate of the special flip-flop or binary 19 are applied to the delay line and reset circuit. The square output pulses appearing on the other plate of the flip-flop are applied to a special display time circuit.

The circuit including start and stop diodes 17 and 18, flip-flop 19, delay line 21, reset circuit 22 and display time circuit 23 will be presently described in detail in conjunction with Figure 3.

The operation of the gate circuit 14, reset circuit 22, and display time circuit 23 is as follows: The rise of a pulse from decade divider 15 triggers the start diode which changes the state of the flip-flop circuit. A square pulse is applied to the delay line 21 and reset circuit 22. The delay introduced by the delay line 21 may for example be approximately 15 microseconds. The counters are, therefore, reset 15 microseconds before gate 14 is opened. The reset circuit 22 provides a pulse to the counters which returns the counters to zero. The delay is necessary to allow the counters to recover before the next impulse is received. When the pulse from the decade divider 15 decays, stop diode 18 is triggered and the flip-flop circuit reverts to its initial state. When the flip-flop reverts to its initial state the gate 14 closes, and triggers the display time circuit. The count is displayed for a predetermined display time. The display time circuit biases the start diode 17 in such a manner that it cannot be triggered during the predetermined display time.

In Figure 5, I have illustrated the sequence of operation. Figure 5A shows the pulse which opens and closes the gate. Figure 5B shows the reset pulse occurring a short interval of time before the gate opens. Figure 5C shows the display pulse occurring a short time before the gate closes. Figure 5D shows the signal applied to the starting diode.

Switches S1, S2, S3, S4 and S5 provided means for switching the various components of the circuit to measure frequently, period, time interval and events.

For frequency measurements the switches are as shown in Figure 1. For period measurements switch S1 is switched to connect amplitude discriminator 10a to the time base generator. Switch S2 is connected to the input circuit, switch S4 is closed and switch S3 is switched to connect the stop and start diodes directly to amplitude discriminator 10b. For event counting switch S1 is connected to input, switch S2 is connected to the input circuit, switch S3 connects the start diode to amplitude discriminator 10b and the stop diode to amplitude discriminator 10c. For time interval counting switch S1 is connected to the time base generator. Switch S2 is connected to the input circuit. Switch S3 is connected so that the start diode is connected to amplitude discriminator 10b and the stop diode to amplitude discriminator 10c.

For period and interval measurements, the counter counts the output of the time base generator for the interval between the events whose interval or period is being measured. To indicate total events the counting period is started and stopped by pulses introduced at switches S4 and S5. A novel input circuit is employed when operating the circuit in interval and event count. This circuit is illustrated in Figure 4 and will presently be described in detail. In essence it provides a means for selecting the threshold voltage.

A special amplitude discriminating circuit which can be used for 10a, b and c is shown in Figure 2. This circuit consists of a direct coupled amplifier 12 and a special bistable multi-vibrator 13. The amplifier section of the amplitude discriminator consists of tubes 31 and 32. Tube 31 has its cathode connected to ground through cathode resistor 33 and bypass condenser 34. The plate of the tube 31 is connected to the B+ supply through resistor 36. Condenser 37 and resistor 38 are connected in parallel. One common lead is connected to the control grid of the tube 32 and the other to the plate of the tube 31. The grid of the tube 32 is grounded by resistor 39. The grid of this tube is also connected to a negative voltage through resistor 41. The suppressor grid of tube 32 is connected to the cathode. The screengrid and plate are connected together and supply the amplified input signal to the grid of the first triode 42 of the special bistable multi-vibrator circuit 13. The plate of tube 32 is connected to the B+ supply through resistor 43. The special multi-vibrator circuit is composed to tubes 42 and 44. The cathodes of tubes 42 and 44 are connected to ground through a common cathode resistor 46. The plates of the tubes 42 and 44 are connected to the B+ supply through resistors 47 and 53. The parallel combination of condenser 48 and resistor 49 is connected in series with resistor 51 to ground. The grid of tube 44 is connected to the common junction of the parallel combination and the resistor 51. A resistor 52 is connected between the plate and grid of tube 44.

The amplitude discriminator shown in Figure 2 operates as follows: The input signal is applied to the grid of the first tube 31. Depending upon the particular application of the apparatus and the particular discriminator we are referring to this signal may be the signal to be measured or the time base generator signal. The applied signal appears as an amplified signal at the plate of the tube 31. A specified fraction of this signal is applied to the grid of tube 32 through the voltage divider network formed by resistors 38 and 39 and condenser 37. The signal applied to tube 32 is amplified and applied to the grid of tube 42. The voltage dividing network is chosen so that the signal applied to the grid of the tube 32 is the same as the signal applied to tube 31. With a decrease in the plate voltage of tube 31, the voltage on the grid of tube 32 decreases by exactly the same amount that the applied signal increases. It can be shown that there is exact compensation for the tube characteristic variations and power supply variation.

As will presently be shown it is necessary for the proper operation of this circuit that there be a stable output of the amplifier section.

The amplifier signal is fed into the novel multivibrator 13, which acts as an amplitude discriminator. The operation of this circuit may readily be described by assuming that we have a source of D. C. voltage which may be varied at will. With zero input tube 42 is cut off and tube 44 conducts. As the voltage increases a value is reached where tube 42 begins to conduct and tube 44 is cut off. If we now reduce the voltage in the grid of tube 42 at some voltage which is lower than that at which it began to conduct it cuts off. The voltage region between where the tube begins to conduct and to cut off is called the "hysteresis" region. It is evident that in this region either of two states may exist, depending on the preceding history of the input signal. The hysteresis may be controlled by varying the circuit parameters. I have controlled the hysteresis by the novel method of providing feedback through resistor 52.

The stable amplifier 12 maintains the grid of tube 42 at a fixed potential which is exactly in the middle of the hysteresis region, for maximum sensitivity of the discriminator. As the applied signal swings beyond the limits of the hysteresis region the circuit changes from one equilibrium position to another. The output signal is a square pulse having a duration which is dependent upon the input frequency. There will be no output pulses for a signal whose excursions are less than the hysteresis voltage.

As will be presently described the input circuit has adjustable attenuation and bias of the signal so that by adjustment of the input circuit an adjustable level of triggering is obtainable.

In Figure 3 I have shown the circuit consisting of start and stop diodes 17 and 18, flip-flop 19, delay line 21, reset circuit 22, and display time circuit 23.

In Figure 3, block 19, I have shown the flip-flop multi-vibrator circuit. This circuit consists of triggering diodes 17 and 18 and tubes 65 and 68. I prefer to use a twin triode 61 as tubes 65 and 68. The cathode of diode 17 is connected through condenser 62 to the starting pulse input 63. The plate of diode 17 is connected to the plate of tube 65, through condenser 64. The plate of tube 65 is grounded through the series resistors 66 and 67. The plate of diode 17 and the common junction of resistors 66 and 67 are connected to the grid of tube 68. Diode 18 is connected to the input pulse through condenser 69. The plate of the diode 18 is connected to the plate of tube 68 through condenser 71. The series resistors 72 and 73 ground the plate of triode 68. The grid of tube 65 is connected to the common junction of resistors 72 and 73 and the plate of diode 18. The cathodes of tubes 65 and 68 are connected to condenser 69 by resistor 74. The cathodes of tubes 65 and 68 are also connected to ground through cathode resistor 76 and by-pass condenser 77. The plates of the tubes 65 and 68 are connected to a positive voltage through resistors 78 and 79 respectively.

The block 21 represents the delay line circuit. The delay line is composed of inductances 81, 81a, 81b, 81c and condensers 82a, 82b, 82c, 82d and 82e. The delay line which I prefer to use has ten such LC sections. Resistors 86 and 87 are connected in series and connect the plate of tube 68 to ground. Neon bulb 88 is connected in shunt with resistor 87. The neon bulb glows for a period of time corresponding to the time that the gate is open. This provides a visual indication of the counting period. Although the neon bulb glows prior to actual gate opening, the time difference is in the order of microseconds (corresponding to the delay of line 21) and is not distinguishable by the eye. Since the same time elapses between extinguishing of the neon lamp and closing of the gate, the overall time during which the bulb is lit is accurately depicted but displaced slightly from the gate opening and closing.

In block 22 I have shown the counter reset circuit. This circuit consists of the thyratron 91 which has its cathode resistor 92 connected to ground. Resistor 93 and condenser 95 are connected in series with the grid of the thyratron and the plate of triode 68. Grid leak resistor 94 is connected between the resistor 93 and the ground terminal. The plate of the thyratron is connected to B+. The screen of the thyratron 91 is tied to the cathode. Condenser 98 is connected between the cathode and the reset lead. The reset pulse is derived at the common lead of the condenser 98 and resistor 102. Resistor 102 is shunted by condenser 101, connected between the reset lead and reset switch 103.

The circuit enclosed by block 23 is the special display time circuit. The circuit consists of thyratron 106, tube 107, tube 108 and a twin triode having triodes 109 and 111. The plate of tube 106 is grounded through the condenser 97 and connected to +B supply voltage through resistor 96. The plate of thyratron 106 is connected to the screen grid by condenser 112. The screen grid and cathode are tied together. The cathode is grounded through resistor 113. The grid of tube 106 is connected to the plate of tube 65 through the series combination of resistor 114 and capacitor 116. The cathode of tube 106 is also connected to ground through the series combination of triode 108, connected to function as a diode, timing condenser 117 and resistor 118. The cathode of diode 107 is connected at the common junction of condenser 116 and resistor 114. The plate of the diode 107 is grounded by resistor 119. The series resistance combination of resistor 121 and 122 is connected between the common terminal of condenser 116 and resistor 114 to a minus voltage. The common terminal of resistors 112 and 121 is connected to the plate of diode 107.

The common junction of timing condenser 117 and triode 108 is connected to the grid of tube 109 through the parallel combination of resistor 123 and condenser 124. The series combination of resistor 126 and variable resistor 127 are connected between the cathode of tube 108 and ground. The series combination of resistors 129 and 130 are connected between ground and a positive voltage. The common terminal of these resistors is provided with a means for connection to the cathode of tube 108. The plates of tube 109 and 111 are connected to a positive voltage through resistors 131 and 132. The cathodes of tubes 111, and 109 are connected to the reset switch through resistor 133. The voltage divider consisting of resistors 134 and 136 is connected between the plate of tube 109 and ground. The common terminal of resistors 134 and 136 is connected to the grid of tube 111. The plate of tube 111 is connected to the cathode of tube 17 by resistor 137. The cathode of tube 17 is grounded by resistor 138.

The circuit illustrated in Figure 3 including the start and stop diodes 17 and 18, the flip-flop 19, the delay line 21, and the reset circuit 22, and the display time circuit 23 operates as follows:

For frequency and period measurement the input terminals 63 are connected together. The input signal which is from the time base generator for frequency measurements or from the signal for period measurements are differentiated by condensers 62 and 69 and applied to the cathodes of diodes 17 and 18. Assuming tube 68 is conducting, when a negative trigger is applied to the grid of tube 68 it is cutoff through diode 27 and the circuit changes state. The plate of tube 68 rises rapidly and a positive voltage is applied to the delay line 21 and the reset circuit 22. The next negative pulse reverts the flip-flop to the original state. The plate voltage of tube 68 decreases to its original value. In essence a square voltage pulse has been produced whose duration is dependent upon the input to the flip-flop circuit. The diodes 17 and 18 couple the negative pulse to the conducting tube and block the pulse from the non-conducting tube. It is evident that a square voltage pulse appears on the plate of tube 65. This pulse is of opposite phase than that in the plate of tube 68. This pulse is applied to the display time circuit 23.

The positive square wave appearing on the plate of the tube 68 is differentiated by condenser 95 and the pulse applied to the thyratron 91. The tube has a stable state which is non-conducting. The thyratron is fired by the trigger pulse and passes into a quasi-stable state in which it is conducting. After a time, which is dependent on circuit parameters, the tube extinguishes the returns to its original state. This particular circuit is used in my invention since it is capable of delivering large output signals in response to small triggering signals. The large output pulse resets the counters.

The positive square wave is applied to the gating circuit after it is delayed by the delay line. The delay is sufficient for the counters to be reset before the gate is open to admit the new count. There is no error introduced by the delay line since the same delay is introduced in opening and closing of the gate.

As previously shown when the time base generator controls the gate frequency is counted, whereas when the input signal controls the gate the time base generator frequency is counted. This latter is an indication of the interval during which the gate is open.

When the flip-flop reverts to its initial state a positive square wave is applied to the display time circuit 23. The square wave is differentiated by 116 and the pulse triggers the thyratron 106, which is non-conducting into a quasi-stable state in which it conducts. The condenser 97 which is chosen large charges during the time the thyratron is non-conductive. When the tube conducts it provides a negative pulse to condenser 117 through the tube 108. Tube 107 acts as a clamping diode.

Condenser 117 discharges through resistors 118, 126 and 127. Resistor 127 is variable so that the time constant of this circuit may be varied. The voltage appearing across the condenser 117 and resistor 118 is applied to the bistable multivibrator or binary circuit having tubes 111 and 109. The parameters of this circuit are chosen so that tube 109 has broad hysteresis, in the order of 20 volts. The voltage appearing across the timing condenser 117 and resistor 118 determines the state of the circuit. When the condenser 117 is fully charged the bistable multivibrator is in a condition such that diode 17 is biased non-conducting. After the condenser 117 is discharged a predetermined amount a reversal of state occurs and the bias is removed from diode 17. By adjusting the variable resistor 127 it is possible to control the time which the diode is biased or non-conducting. With diode 17 biased the next count cannot be started. When the bias is removed the count begins when the next signal 63 is applied. The display time may be made infinite by closing switch 120. With switch 120 in this position it is possible to start another count by pushing the reset plunger which removes the bias and permits a new count to start when the next signal 63 is applied. The new count will be displayed until the button is again depressed.

In Figure 4 I have shown the special input circuit employed in time interval measurements. An adjustable trigger level may be obtained by adjustment of this circuit. The input circuit consists of resistors 151, 152 and 153 connected in series and having the free terminals grounded. Resistors 151 is shunted by condenser 154 and resistor 153 by condenser 56. The common junction of resistors 151 and 152 is connected to a positive potential +V through resistor 157. The common lead of resistors 152 and 153 is connected to a negative potential —V through resistor 158. Resistor 152 is center taped and connected to the input terminal through the parallel combination of resistor 159 and condenser 161. The output is taken out through the variable tap 162.

Operation of this input circuit is as follows: If resistor 159 is chosen large in comparison to the resistance to ground from the center tap of resistor 162 only a fraction of the input voltage appears between the center tap and ground. The amount of signal voltage chosen may be varied by varying the variable tap. When voltages are applied as shown it is possible to superpose a bias on the signal. This permits control of the triggering level.

Apparatus was constructed in accordance with Figure 1 in which the circuit parameter in Figures 2, 3 and 4 had the following values:

In Figure 2: Tubes 31 and 32 triode-pentode known by manufacturers' specifications as 6U8; tubes 42 and 44 twin triode known by manufacturers' specifications as 5844; resistor 33, 270Ω; resistor 36, 10KΩ; resistor 38, 68KΩ; resistor 39, 6200Ω; resistor 41, 47KΩ; resistor 43, 27KΩ; resistor 46, 15KΩ; resistor 47, 15KΩ; resistor 49, 560KΩ; resistor 51, 330KΩ; resistor 52, 1.8 megΩ; resistor 53, 15KΩ; condenser 34, 3,000 μμf.; condenser 37, 15 μμf.; condenser 48, 10 μμf.

In Figure 3: Tubes 17 and 18, twin diode known by manufacturers' specifications as 6AL5; tubes 65 and 68 dual triode known by manufacturers' specifications as 5963; tubes 91 and 106 gas tetrodes known by manufacturers' specifications as 2D21; tube 107 one half of diode known by manufacturers' specifications as 2AL5; tube 108 one half of triode known by manufacturers' specifications as 5963; tubes 109 and 111 twin triode known by manufacturers' specifications as 5844; resistor 66, 82KΩ; resistor 67, 56KΩ; resistor 72, 82KΩ; resistor 73, 56KΩ; resistor 74, 56KΩ; resistor 76, 10KΩ; resistor 78, 47KΩ; resistor 79, 18KΩ; resistor 86, 680KΩ; resistor 87, 1 megΩ; resistor 92, 330KΩ; resistor 93, 68KΩ; resistor 94, 1 megΩ; resistor 96, 1,000Ω; resistor 102, 270Ω; resistor 113, 330K; resistor 114, 62KΩ; resistor 118, 100Ω; resistor 119, 22KΩ; resistor 121, 220KΩ; resistor 122, 47KΩ; resistor 123, 1 megΩ; resistor 126, 10KΩ; resistor 127, 0-5 megΩ; resistor 129, 229KΩ; resistor 130, 56KΩ; resistor 131, 220KΩ; resistor 132, 100KΩ; resistor 133, 39KΩ; resistor 134, 100KΩ; resistor 136, 1 megΩ; resistor 137, 150KΩ; resistor 138, 820KΩ; condenser 62, 50 μf.; condenser 64, 100 μf.; condenser 69, 50 μf.; condenser 71, 100 μf.; condenser 77, .01 μf.; condensers 82a, b, c, d, e, each 50 μf.; condenser 95, 50 μf.; condenser 97, 20 μf.; condenser 98, .01 μf.; condenser 101, 500 μf.; condenser 112, .01 μf.; condenser 117, 4 μf.; condenser 124, 5 μf; inductors 81, 81a, b, c, d, each 60 mh.

In Figure 4: resistor 151, 20KΩ; resistor 152, 250KΩ; resistor 153, 20KΩ; resistor 157, 680KΩ; resistor 158, 330KΩ; resistor 159, 180KΩ; condenser 154, 30 μf.; condenser 156, 30 μf.; condenser 161, 10 μf.

On frequency measurements the accuracy of the apparatus on the one second gate was 0.002% ±1 C. P. S. and on the 10 second gate 0.002% ±0.1 C. P. S.

On period measurements the accuracy was within 0.03% plus or minus 1 count possible error of the counter circuits.

For time interval the accuracy was within .0027% plus or minus one period of the standard frequency.

I claim:

1. An electronic counter of the character described comprising means forming pulses which have the same frequency as a signal applied thereto, pulse counting means, said pulse counting means serving to count the pulses applied thereto, an electronic gate serving to control the application of said pulses to the counting means, a binary circuit serving to form a gating pulse in response to start and stop pulses, start and stop diodes serving to control the application of the start and stop pulses to the binary circuit, said gating pulse commencing with the application of the start pulse and ending with the application of the stop pulse and having a duration equal to the time lapse between the start and stop pulses, said electronic gate connected to receive said gating pulse and remain open during the pulse interval, reset means connected to receive the gating pulse and develop a reset pulse at the start of the gating pulse to reset the counting means, and means connected to receive the gating pulse and serving to control the bias on the start diode to control the application of start pulses to the binary circuit for a predetermined period of time after completion of a counting cycle.

2. An electronic counter as in claim 1 in which said means serving to form pulses having the frequency of the input signal comprises amplifying means, and amplitude discriminating means connected to receive the output of said amplifying means.

3. An electronic counter as in claim 2 wherein said amplitude discriminating means comprises a pair of vacuum tubes having at least plate, grid and cathode elements connected to form a multivibrator circuit, said multivibrator having a hysteresis region, and means including at least one feedback resistor for controlling said hysteresis region.

4. An electronic counter of the character described comprising squaring means forming square pulses which have the same frequency as a signal applied thereto, pulse counting means for counting the square pulses, an electronic gate serving to control the application of pulses to the counting means, a binary circuit serving to form a gating pulse in response to start and stop pulses, said gating pulse commencing with the application of the start pulse to the binary circuit and ending with the application of the stop pulse to the binary circuit and having a duration equal to the time interval between the start and stop pulses, said binary circuit comprising a multivibrator having first and second vacuum tubes each including at least plate, grid and cathode elements, start and stop diodes connected to the grids of said first and second tubes respectively, said diodes serving to transmit start and stop pulses to the respective grids of the tube to switch the binary circuit and form the gating pulse, a delay line connected to receive the gating pulse and delay the same prior to application to the gate, reset means connected to receive said gating pulse, said reset means forming a reset pulse to reset the counting means, and means connected to receive said gating pulse and serving to bias the start diode whereby start pulses may not be transmitted to the grid of said first tube for a predetermined period of time.

5. Apparatus as in claim 4 wherein said means for biasing said start diode comprises a capacitor, pulse forming means connected to receive the gating pulse and serving to control the charge on said capacitor, and means connected to said capacitor serving to bias said start diode to prevent a start pulse from being applied to the grid of said first tube.

6. An electronic counter of the character described, comprising input means for controlling the bias and amplitude of a signal applied thereto, amplifying means connected to said input means, amplitude discriminating means connected to receive the output of said amplifying means and serving to form square pulses having the frequency of the applied signal, pulse counting means, said means serving to count pulses applied thereto, an electronic gate serving to control the application of pulses to the counting means, a binary circuit serving to form gating pulses in response to start and stop pulses, said gating pulse commencing with the application of the start pulse and ending with the application of a stop pulse to the binary circuit and having a duration equal to the time duration between the start and stop pulses, said binary circuit comprising a multivibrator having first and second vacuum tubes each including at least plate, grid and cathode elements, start and stop diodes connected to the grids of said first and second tubes respectively, said diodes serving to transmit start and stop pulses to the associated grids to switch the binary circuit to thereby form the gating pulse, a delay line connected to receive said gating pulse and delay the same prior to application to said gate, said gating pulses serving to control the gate whereby the same is open during the pulse interval, reset means connected to receive the gating pulse, said reset means forming a reset pulse to reset the counting means, and means connected to receive the gating pulse and serving to bias the start diode whereby start pulses may not be transmitted to the grid of said first tube for a predetermined period of time.

7. Apparatus as in claim 6 wherein said input means comprises a center tapped resistor, a first resistor connected to one end thereof, a second resistor connected to the other end thereof, said first and second resistors having their ends ground, first and second capacitors shunting said first and second resistors respectively, third and fourth resistors having one end at each connected to the ends of said center tapped resistor and other end to voltage sources, a parallel combination including a resistor and capacitor connected to the center tap and serving to receive the input signal, and an adjustable tap on said center tapped resistor for controlling the bias and amplitude of the output signal.

8. Apparatus as in claim 6 wherein said means for biasing said start diode comprises a capacitor, pulse forming means connected to receive said gating pulse and serving to control the charge on said capacitor, and means connected to said capacitor serving to bias said start diode to prevent a start pulse from being applied to the grid of said first tube.

9. Apparatus as in claim 6 wherein said amplitude discriminating means comprises a pair of vacuum tubes having at least plate, grid and cathode elements connected to form a multivibrator circut, said multivibrator having a hysteresis region, and means including a feedback resistor for controlling said hysteresis region.

10. An electronic counter of the character described comprising pulse counting means, said pulse counting means serving to count pulses applied thereto, an electronic gate serving to control the application of pulses to said counting means, a binary circuit serving to form a gating pulse in response to start and stop pulses, start and stop diodes serving to control the application of start and stop pulses to the binary circuit, said gating pulse commencing with the application of the start pulse and ending with the application of the stop pulse to said binary circuit and having a duration equal to the time lapse between said start and stop pulses, said electronic gate connected to receive said gating pulse and remain open during the duration of the same, reset means connected to receive the gating pulse and develop a reset pulse at the start of the gating pulse to reset the counting means, and adjustable means connected to receive the gating pulse and serving to control the bias on the start diode to control the application of start pulses to the binary circuit for a predetermined time after completion of a counting cycle.

11. An electronic counter as in claim 10 in which a delay line serves to delay the application of gating pulses to said gating means whereby the counter is reset prior to the opening of said gate.

12. An electronic counter of the character described comprising squaring means forming square pulses which have the same frequency as a signal applied thereto, pulse counting means, said means serving to count the square pulses, an electronic gate serving to control the application of pulses to the counting means, a binary circuit serving to form a gating pulse in response to start and stop pulses, said gating pulse commencing with the application of the start pulse to the binary circuit and ending with the application of the stop pulse to the binary circuit and having a duration equal to the time interval between the start and stop pulses, said binary circuit comprising a multivibrator having first and second vacuum tubes each including at least plate, grid and cathode elements, start and stop diodes connected to the grids of said first and second tubes respectively, said diodes serving to transmit start and stop pulses to the respective grids of the tube to switch the binary circuit and form the gating pulse, reset means connected to receive said gating pulse, said reset means forming a reset pulse to reset the counting means, and means connected to receive said gating pulse and serving to bias the start diode whereby start pulses may not be transmitted to the grid of said first tube for a predetermined period of time.

13. Apparatus as in claim 12 wherein said means for biasing said start diode comprises a capacitor, pulse forming means connected to receive the gating pulse and serving to control the charge on said capacitor, and means connected to said capacitor serving to bias said start diode to prevent a start pulse from being applied to the grid of said first tube.

14. An electronic counter of the character described comprising pulse counting means adapted to count pulses applied thereto, an electronic gate serving to control the application of pulses to said counting means, a binary circuit serving to form a gating pulse in response to start and stop pulses, start and stop diodes serving to control the application of said start and stop pulses to the binary circuit, said gating pulse commencing with the application of a start pulse and ending with the application of a stop pulse and having a duration equal to the time lapse between the start and stop pulses, said electronic gate connected to receive said gating pulses and remain open during the duration of the same, and adjustable means connected to receive the gating pulse and serving to control the bias on the start diode to block the application of start pulses to the binary circuit for a predetermined time after completion of a counting cycle.

15. An electronic counter of the character described comprising pulse counting means adapted to count pulses applied thereto, an electronic gate serving to control the application of pulses to said counting means, a binary circuit serving to form a gating pulse in response to start and stop pulses, start and stop diodes serving to control the application of start and stop pulses to said binary circuit, said gating pulse commencing with the application of a start pulse and ending with the application of a stop pulse and having a duration equal to the time lapse between said start and stop pulses, said electronic gate connected to receive said gating pulse and remain open during the duration of the same, means for biasing the binary circuit gating means, said last named means comprising a capacitor, pulse forming means connected to receive said gating pulses and serving to control the charge on said capacitor and means connected to said capacitor serving to bias said start diode to block application of a start pulse to the binary circuit for a predetermined period of time after a counting cycle has been completed.

16. An electronic counter of the character described comprising means forming pulses which have the same frequency as a signal applied thereto, pulse counting means, said pulse counting means serving to count the pulses applied thereto, an electronic gate serving to control the application of said pulses to the counting means, a binary circuit serving to form a gating pulse in response to start and stop pulses, start and stop diodes serving to control the application of the start and stop pulses to the binary circuit, said gating pulse commencing with the application of the start pulse and ending with the application of the stop pulse and having a duration equal to the time lapse between the start and stop pulses, said electronic gate connected to receive said gating pulse and remain open during the pulse interval, reset means connected to receive the gating pulse and develop a reset pulse at the start of the gating pulse to reset the counting means, and start diode biasing means connected to receive said gating pulse to be activated thereby and connected to said start diode to control the bias on the same to block the application of start pulses for a predetermined period of time.

17. An electronic counter of the character described comprising pulse counting means adapted to count pulses applied thereto, an electronic gate serving to control the application of pulses to said counting means, a binary circuit serving to form a gating pulse in response to start and stop pulses, start and stop diodes serving to control the application of said start and stop pulses to the binary circuit, said gating pulse commencing with the application of a start pulse and ending with the application of a stop pulse and having a duration equal to the time lapse between the start and stop pulses, said electronic gate connected to receive said gating pulses and remain open during the duration of the same, and start diode biasing means connected to receive said gating pulse to be activated thereby and connected to said start diode to control the bias on the same to block the application of start pulses for a predetermined period of time.

References Cited in the file of this patent

UNITED STATES PATENTS

| | | |
|---|---|---|
| 2,403,873 | Mumma | July 9, 1946 |
| 2,422,698 | Miller | June 24, 1947 |
| 2,516,189 | Dinsmore | July 25, 1950 |
| 2,521,788 | Grosdoff | Sept. 12, 1950 |
| 2,558,447 | MacSorley | June 26, 1951 |
| 2,580,771 | Harper | Jan. 1, 1952 |
| 2,665,411 | Frady | Jan. 5, 1954 |
| 2,680,241 | Gridley | June 1, 1954 |
| 2,696,557 | Gray | Dec. 7, 1954 |
| 2,743,419 | Chatterton et al. | Apr. 24, 1956 |
| 2,767,582 | Bartilink | Oct. 23, 1956 |

OTHER REFERENCES

Hewlett Packard Journal, volume 2, Number 5, January 1951 (3 pages).

Electronics, December 1951, pages 156, 160, 164, 168 and 172.

Electronics, "Frequency Meter Uses Digital Counters" by Boff, June 1954, pages 189–191.